US 9,578,305 B2

(12) United States Patent
Suh et al.

(10) Patent No.: US 9,578,305 B2
(45) Date of Patent: *Feb. 21, 2017

(54) DIGITAL RECEIVER AND METHOD FOR PROCESSING CAPTION DATA IN THE DIGITAL RECEIVER (71) Applicant: LG Electronics Inc., Seoul (KR)

(72) Inventors: Jongyeul Suh, Seoul (KR); Nagaraj Nandhakumar, San Diego, CA (US); Timothy Laud, Libertyville, IL (US)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/980,519

(22) Filed: Dec. 28, 2015

(65) Prior Publication Data
US 2016/0119604 A1 Apr. 28, 2016

Related U.S. Application Data (63) Continuation of application No. 13/703,836, filed as application No. PCT/KR2011/004683 on Jun. 27, 2011, now Pat. No. 9,258,544.

(Continued)

(51) Int. Cl.
H04N 15/00 (2006.01)
H04N 13/00 (2006.01)
H04N 13/04 (2006.01)
H04N 21/488 (2011.01)
H04N 21/81 (2011.01)
(Continued)

(52) U.S. Cl.
CPC .......... H04N 13/007 (2013.01); H04N 13/004 (2013.01); H04N 13/0022 (2013.01); H04N 13/0048 (2013.01); H04N 13/0059 (2013.01); H04N 13/0066 (2013.01); H04N 21/4343 (2013.01); H04N 21/4884 (2013.01);
(Continued)

(58) Field of Classification Search
USPC .... 386/239, 244, 245, 246, 248; 348/42, 43, 348/51
See application file for complete search history.

(56) References Cited

U.S. PATENT DOCUMENTS

2009/0257452 A1 10/2009 Lee et al.
2011/0119708 A1* 5/2011 Lee ...................... H04N 13/004 725/39
2013/0010062 A1* 1/2013 Redmann ............... H04N 5/278 348/43

FOREIGN PATENT DOCUMENTS

CN 101653011 A 2/2010
JP 2003-203251 A 7/2003
(Continued)

Primary Examiner — Daquan Zhao
(74) Attorney, Agent, or Firm — Dentons US LLP

(57) ABSTRACT

The present description provides a digital receiver which provides 3D caption data and a method for processing 3D caption data in the digital receiver of the present invention. A method for transmitting a broadcast signal for 3D service according to one aspect of the present invention comprises the following steps: encoding 3D video ES including a 3D caption service; generating signaling information for signaling a 3D video service including the encoded 3D video ES; and transmitting a digital broadcast signal including the 3D video service and the signaling information, wherein said 3D caption service includes a first command code for generating left caption data and a second command code for indicating a disparity value for a caption window, and generates right caption data on the basis of the first command code and second command code.

4 Claims, 9 Drawing Sheets

Caption for Stereoscopic Display (a)

(b)

Disparity Value for Caption Window

Related U.S. Application Data (60) Provisional application No. 61/358,935, filed on Jun. 27, 2010, provisional application No. 61/425,739, filed on Dec. 21, 2010.

(51) Int. Cl.
  *H04N 21/434* (2011.01)
  *H04N 9/80* (2006.01)
  *H04N 5/92* (2006.01)
  *H04N 9/82* (2006.01)
  *H04N 5/445* (2011.01)

(52) U.S. Cl.
  CPC ....... *H04N 21/816* (2013.01); *H04N 21/8146* (2013.01); *H04N 2005/44526* (2013.01)

(56) References Cited

FOREIGN PATENT DOCUMENTS

| | | |
|---|---|---|
| KR | 10-1997-0078600 A | 12/1997 |
| KR | 10-2005-0099997 A | 10/2005 |
| KR | 10-2007-0043926 A | 4/2007 |
| WO | 2009-078678 A2 | 6/2009 |
| WO | 2010-010499 A1 | 1/2010 |
| WO | 2010-064784 A2 | 6/2010 |

\* cited by examiner

Caption for Stereoscopic Display (a)

| b7 | b6 | b5 | b4 | b3 | b2 | b1 | b0 | |
|---|---|---|---|---|---|---|---|---|
| 0 | 0 | 0 | 1 | 1 | 0 | 0 | 1 | command |
| aw_flag | id2 | id1 | id0 | dp_sign | dp10 | dp9 | dp8 | data1 |
| dp7 | dp6 | dp5 | dp4 | dp3 | dp2 | dp1 | dp0 | data2 |

FIG. 7

| Coded values | | Rendered by the Display System | | | |
|---|---|---|---|---|---|
| Coded disparity value (N) | Anchor horizontal position (A) | Displayed video width (W) | Disparity (offset) value used for rendering the caption | Horizontal position of caption window in the left image | Horizontal position of corresponding caption window in the right image |
| 24 | 21 | 1920 (16:9) | 24 | 192 | 216 |
| 24 | 21 | 1280 (16:9) | 16 | 128 | 144 |
| 24 | 21 | 720 (4:3) | 9 | 36 | 45 |
| N | A | W (for 16:9 formats) | N * (W / 1920) | (A / 210) * W | (A / 210) * W + N * (W / 1920) |
| N | A | W (for 4:3 formats) | N * (W / 1920) | (A / 160) * W | (A / 160) * W + N * (W / 1920) |

| b7 | b6 | b5 | b4 | b3 | b2 | b1 | b0 | |
|---|---|---|---|---|---|---|---|---|
| 0 | 0 | 0 | 1 | 1 | 0 | 0 | 0 | command |
| aw_flag | id2 | id1 | id0 | dp_sign | dp10 | dp9 | dp8 | data1 |
| dp7 | dp6 | dp5 | dp4 | dp3 | dp2 | dp1 | dp0 | data2 |
| fc7 | fc6 | fc5 | fc4 | fc3 | fc2 | fc1 | fc0 | data3 |

FIG. 10

| b7 | b6 | b5 | b4 | b3 | b2 | b1 | b0 | |
|---|---|---|---|---|---|---|---|---|
| 0 | 0 | 0 | 1 | 1 | 0 | 0 | 0 | command |
| 0 | id2 | id1 | id0 | dp_sign | dp10 | dp9 | dp8 | data1 |
| dp7 | dp6 | dp5 | dp4 | dp3 | dp2 | dp1 | dp0 | data2 |
| fc7 | fc6 | fc5 | fc4 | fc3 | fc2 | fc1 | fc0 | data3 |

FIG. 11

DIGITAL RECEIVER AND METHOD FOR PROCESSING CAPTION DATA IN THE DIGITAL RECEIVER

This application is a continuation of Ser. No. 13/703,836 filed on Dec. 12, 2012, which claims the benefit of priority of PCT/KR2011/004683 filed on Jun. 27, 2011 and U.S. Provisional Application No. 61/358,935 filed on Jun. 27, 2010 and 61/425,739 filed on Dec. 21, 2010, all of which are incorporated by reference in their entirety herein.

BACKGROUND OF THE INVENTION

Field of the Invention

The present invention relates to a digital receiver and a method for processing caption data in the digital receiver, and more particularly, to a digital receiver that provides 3-Dimensional (3D) caption data and a method for processing 3D caption data in the digital receiver.

Discussion of the Related Art

A 3-Dimensional (3D) image allows the user to experience 3D effects using the principle of stereo vision which provides the sense of perspective through different views of the two eyes which are separated by about 65 mm, i.e., through binocular parallax due to the distance between the two eyes. The 3D image is provided such that corresponding planar images are viewed with the left and right eyes, thereby allowing the user to experience 3D and perspective effects.

Existing broadcast services have been two-dimensional (2D) services until now from the analog broadcast era even though digital broadcasts are currently active.

However, interest in a 3D service of a 3D (or stereoscopic) image that provides more realism and perspective, compared to a planar 2D service, has increased recently, starting from a specific field of application, and thus investment in 3D services and related services have gradually increased.

Interest in and studies into a digital receiver which can provide a 3D service have also increased.

However, a conventional digital receiver provides only 2D caption data and handles caption data of content as 2D caption data even when the content is 3D such that the user cannot satisfactorily view the caption data, thus providing user discomfort.

SUMMARY OF THE INVENTION

The present invention has been made to overcome the above problems and an object of the present invention is to provide a digital receiver that can provide 3D caption data while maintaining compatibility with legacy devices.

Another object of the present invention is to appropriately control, when a plurality of 3D caption data is provided, all or each of the plurality of caption data.

Another object of the present invention is to prevent, when disparity information of 3D caption data has changed, the user from experiencing vertigo due to processing associated with change in the 3D caption data.

The present invention provides a digital receiver for providing 3D caption data and a processing method for the same.

A method for transmitting a broadcast signal for a three-dimensional, 3D, service in one aspect of the present invention includes encoding a 3D video Elementary Stream, ES, including a 3D caption service, generating signaling information for signaling a 3D video service including the encoded 3D video ES, and transmitting the digital broadcast signal including the 3D video service and the signaling information, wherein the 3D caption service includes a first command code for generating left caption data and a second command code indicating a disparity value of a caption window and right caption data is generated based on the first command code and the second command code.

The second command code may include a flag indicating whether or not the same disparity value is to be applied to all currently decoded windows regardless of a window ID in a receiver.

The disparity value indicated by the second command code according to a value of the flag may be applied to all caption windows or to a caption window of a specific window ID indicated in the second command code.

The 3D caption service data may be extracted from one of a Supplemental Enhancement Information, SEI, message or a picture header of the 3D video ES.

A method for processing a broadcast signal for a three-dimensional (3D) service in accordance with another aspect of the present invention includes receiving a digital broadcast signal including an encoded 3D service and signaling information for the encoded 3D service, extracting a 3D video Elementary Stream, ES, from a 3D service, extracting data for a 3D caption service from the extracted 3D video ES, and providing a 3D caption service using the extracted 3D caption service data, wherein the extracted 3D caption service includes a first command code for generating left caption data and a second command code indicating a disparity value of a caption window and right caption data is generated based on the first command code and the second command code.

The second command code may include a flag indicating whether or not the same disparity value is to be applied to all currently decoded caption windows regardless of a window ID.

The disparity value indicated by the second command code according to a value of the flag may be applied to all caption windows or to a caption window of a specific window ID indicated in the second command code.

The 3D caption service data may be extracted from one of a Supplemental Enhancement Information, SEI, message or a picture header of the 3D video ES.

The 3D caption service data may further include a third command code for performing control for allowing a corresponding caption window to be located at a depth corresponding to a different disparity after a number of frames corresponding to a frame count have elapsed.

A value corresponding to the third command code may gradually change a disparity at an every frame or intervals of a predetermined frame period.

A method for processing a broadcast signal for a three-dimensional (3D) service in accordance with another aspect of the present invention includes receiving a digital broadcast signal including an encoded 3D service and signaling information for the encoded 3D service, extracting a 3D video Elementary Stream, ES, from a 3D service, extracting data for a 3D caption service from the extracted 3D video ES, and providing a 3D caption service using the extracted 3D caption service data, wherein the extracted 3D caption service includes a first command code for generating left caption data, a second command code indicating a disparity value of a caption window, and a third command code for performing control for allowing a corresponding caption window to be located at a depth corresponding to a different disparity after a number of frames corresponding to a frame count have elapsed, and right caption data is generated based on the first command code and the second command code.

A method for processing a broadcast signal for a three-dimensional (3D) service in accordance with another aspect of the present invention includes receiving a digital broadcast signal including a 3D service and signaling information for the encoded 3D service, extracting a 3D video Elementary Stream, ES, from a 3D service, extracting data for a 3D caption service from the extracted 3D video ES, determining a coordinate of a caption window using a first command code for generating left caption data, the first command code being included in the extracted 3D caption service data, determining a disparity value of a caption window according to a second command code indicating a disparity value of the caption window, determining a coordinate of a corresponding caption window that is to be overlaid on right caption data using horizontal size information of a video ES and a disparity, storing caption data in an image format, mixing left caption data and a left video picture and right caption data and a right video picture, and interleaving mixed images according to a display format and outputting the interleaved images.

A digital receiver for processing a three-dimensional (3D) service in accordance with another aspect of the present invention includes a reception unit configured to receive a digital broadcast signal including the 3D service and signaling information for the 3D service, a demultiplexer configured to demultiplex the digital broadcast signal into the 3D service and the signaling information, a decoder configured to extract and decode a 3D video Elementary Stream, ES, from the 3D service and extract and output 3D caption data from the extracted 3D video ES, a caption data processor configured to decode the extracted 3D caption data, a graphic processor configured to process and store a caption image of left and right view images based on the decoded 3D caption data, a mixer configured to mix 3D video data and 3D caption data, a 3D formatter configured to interleave and output the mixed data according to a display format, and a display unit configured to output interleaved 3D service data.

The 3D caption data may includes a first command code for generating left caption data, a second command code indicating a disparity value of a caption window, and a third command code for performing control for allowing the caption window to be located at a depth corresponding to a different disparity after a number of frames corresponding to a frame count have elapsed, and right caption data may be generated based on the first command code and the second command code.

The second command code may include a flag indicating whether or not the same disparity value is to be applied to all currently decoded caption windows regardless of a window ID and the digital receiver may apply the disparity value indicated by the second command code according to a value of the flag to all caption windows or to a caption window of a specific window ID indicated in the second command code.

The present invention has a variety of advantages.

First, it is possible to provide the digital receiver with 3D caption data while maintaining compatibility with legacy devices.

Second, when a plurality of 3D caption data is provided, it is possible to fully or individually control the plurality of 3D caption data.

Third, even when disparity information of 3D caption data has rapidly changed, it is possible to perform processing so as to prevent the user from experiencing vertigo.

DETAILED DESCRIPTION OF THE INVENTION

Various embodiments of an image processing apparatus and method according to the present invention are described in detail with reference to the accompanying drawings.

The present invention relates to a digital receiver and a method for processing caption data of a digital receiver and more particularly to the digital receiver that provides 3-Dimensional (3D) caption data and a method for processing 3D caption data in the digital receiver.

This disclosure describes various embodiments of the present invention in the following aspects. First, 3D caption data is provided to the digital receiver while maintaining backward compatibility with legacy devices. Second, when a plurality of 3D caption data is provided, all or each of the plurality of caption data is appropriately controlled. Third, when disparity information of the provided 3D caption data is changed, processing of the disparity information is performed such that the user does not experience vertigo due to the processing of the disparity information. Specifically, if disparity information is applied immediately when the disparity information has sharply changed, the sharply changed disparity may provide user discomfort, thereby causing the user to experience uncomfortable during 3D viewing.

The above aspects of the present invention are sequentially described below with reference to the accompanying drawings.

For better understanding and ease explanation of the present invention, the digital receiver may be exemplified by a digital television receiver that includes a component for 3D service processing. The digital television receiver may be a receiving set that includes a set-top box including the component for 3D service processing and a digital unit for outputting a 3D service processed by the set-top box. The digital television receiver may also be provided in the form of an integrated processing module. The digital receiver may also include any device, which receives, processes, and/or provides a 3D service, such as a Personal Digital Assistant (PDA), a mobile phone, or a smart phone. The digital receiver may also be one of a 3D only receiver and a receiver for both 2D and 3D.

Methods for expressing a 3D image include a stereoscopic image display method which takes into consideration 2 views and a multi-view image display method which takes into consideration 3 or more views. The conventional single-view image display method is also referred to as a monoscopic image display method.

The stereoscopic image display method uses a pair of images acquired by capturing the same subject using two cameras, i.e., a left camera and a right camera. The multi-view image display method uses 3 or more images acquired by capturing the same subject using 3 or more cameras having predetermined distances or angles.

Although the present invention is described below with reference to the stereoscopic image display method as an example, the spirit of the present invention can also be applied to the multi-view image display method according to the same or similar principle.

Transmission formats of a stereoscopic image are classified into single video stream formats and multi-video stream formats.

The single video stream formats include side-by-side, top/down, interlaced, frame sequential, checker board, and anaglyph formats and the multi-video stream formats include full left/right, full left/half right, and 2D video/depth formats.

A stereoscopic image or a multi-view image may be transmitted after being compressed and encoded through various image compression coding schemes including Moving Picture Experts Group (MPEG).

For example, a stereoscopic image in the side-by-side, top/down, interlaced, or checker board format may be transmitted after being compressed and encoded through an H.264/Advanced Video Coding (AVC) scheme. Here, a receiving system may obtain a 3D image by decoding the stereoscopic image in a reverse manner of the H.264/AVC coding scheme.

A left view image among full left/half right view images or one of multi-view images is a base layer image and the remaining image is assigned as an enhanced layer image. The base layer image may be transmitted after being encoded using the same scheme as a monoscopic image. On the other hand, the enhanced layer image may be transmitted after only correlation information between the base layer and enhanced layer images is encoded. For example, JPEG, MPEG-1, MPEG-2, MPEG-4, H.264/AVC, or the like may be used as a compression coding scheme of the base layer image. H.264/Multi-view Video Coding (MVC) may be used as a compression coding scheme of the upper layer image. Here, while the stereoscopic image is allocated as a base layer image and an enhanced layer image, the multi-view image is allocated as a base layer image and a plurality of enhanced layer images. A reference for dividing the multi-view image into a base layer image and one or more enhanced layer images may be determined based on the positions of cameras or based on the arrangement of the cameras. Such a reference for division may also be arbitrarily determined without a specific criterion or rule.

Such 3D image display types are broadly classified into a stereoscopic type, a volumetric type, and a holographic type. For example, a 3D image display device that employs such stereoscopic technology adds depth information to a 2D image and allows users to experience 3D liveliness and realism through such depth information.

3D image viewing types are broadly classified into a glasses type and a glass-free type.

The glasses type is classified into a passive type and an active type. The passive type uses polarized light filters to allow the user to separately view a left-eye image and a right-eye image. The passive type also includes a type which allows the user to view 3D images using green and red colored glasses respectively with the two eyes. On the other hand, the active type separates left and right view images using liquid crystal shutters which open left and right glasses sequentially in time to separate left-eye and right-eye images. In the active type, time-divided screens are repeated at intervals of a predetermined period and electronic shutters which are synchronized with the period are mounted on glasses which the user wears to view 3D images. Such an active type is also referred to as a time-split type or a shuttered glass type.

Typical glass-free types include a lenticular type in which a lenticular lens plate, on which a cylindrical lens array is vertically arranged, is installed at a front side of a display panel and a parallax barrier type in which a barrier layer having periodic slits is provided on top of a display panel. However, the present invention is described below with reference to the glasses type as an example for ease of explanation.

Figure 1:
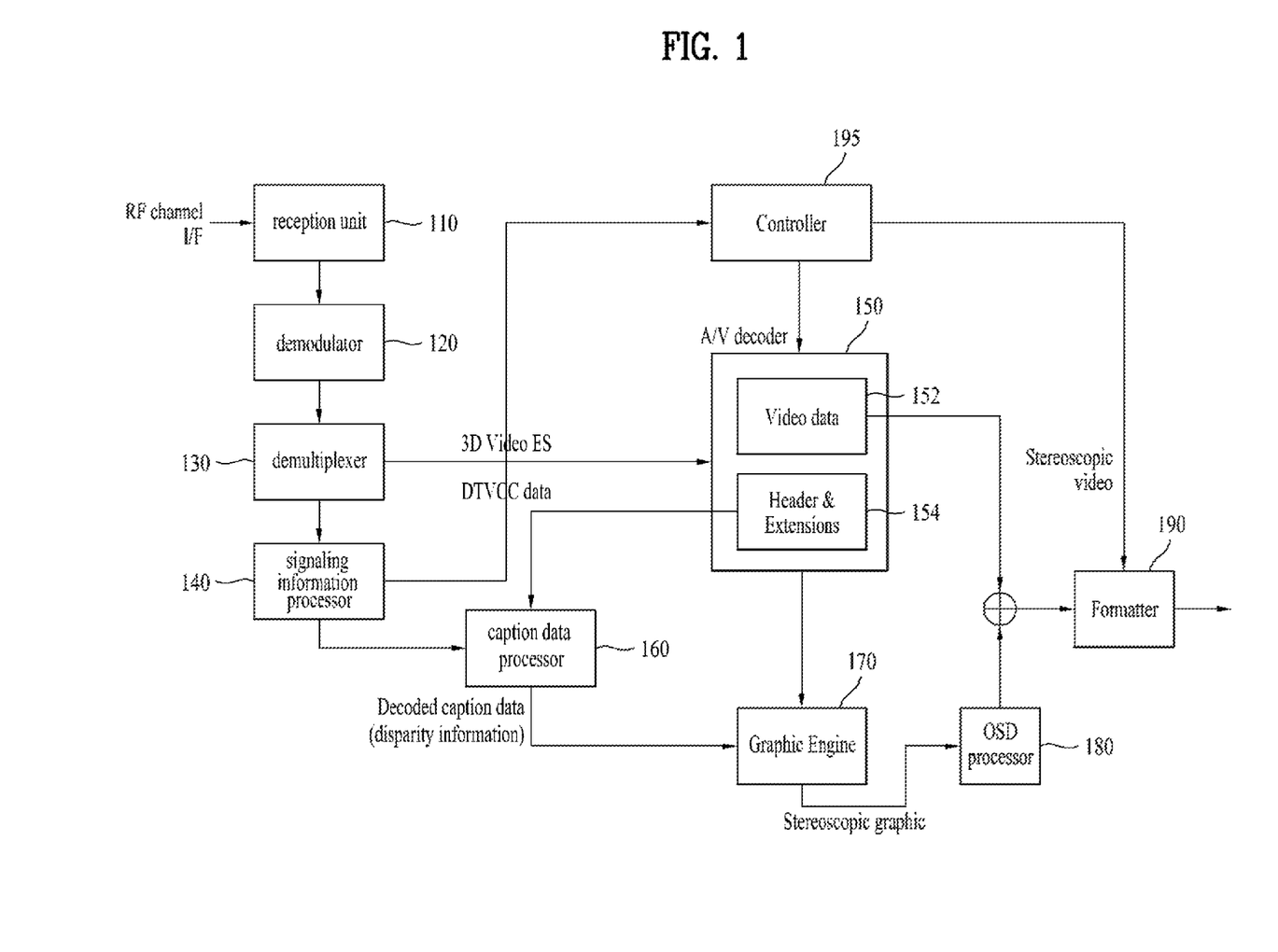
FIG. 1 illustrates an exemplary digital receiver according to the present invention.

FIG. 1 illustrates an exemplary digital receiver according to the present invention.

As shown in FIG. 1, the digital receiver according to the present invention includes a reception unit 110, a demodulator (or demodulation part) 120, a demultiplexer (demultiplexing part) 130, a signaling information processor (or SI processing part) 140, an audio/video (A/V) decoder 150, a caption data processor 160, a graphics engine 170, an On-Screen Display (OSD) processor 180, a mixer 185, a 3D output formatter 190, and a controller 195.

The following is a description of basic operations of the components of the digital receiver and the present invention will be described in more detail in each embodiment described later.

The reception unit 110 receives a digital broadcast signal including 3D image data and caption data for the 3D image data from a content source through an RF channel.

The demodulator 120 demodulates the received digital broadcast signal using a demodulation scheme corresponding to a modulation scheme that has been applied to the digital broadcast signal at the transmitting side.

The demultiplexer 130 demultiplexes the demodulated digital broadcast signal into audio data, video data, and signaling information. Here, the demultiplexer 130 may perform filtering on the demodulated digital broadcast signal using a Packet IDentifier (PID) to demultiplex the demodulated digital broadcast signal into audio data, video data, and signaling information. The demultiplexer 130 outputs the demultiplexed audio and video signals to the A/V decoder 150 and outputs the signaling information to the signaling information processor 140.

The signaling information processor 140 processes the signaling information received from the demultiplexer 130 and provides the processed signaling information to each component which requires the processed signaling information. Here, although the signaling information may include System Information (SI) such as Digital Video Broadcasting-Service Information (DVB-SI), Program Specific Information (PSI), and Program and System Information Protocol (PSIP) information, the following description is given with reference to PSI/PSIP information as an example for ease of explanation. The signaling information processor 140 may internally or externally include a database (DB) that temporarily stores the processed signaling information. The signaling information will be described in more detail in each embodiment described later.

The signaling information processor 140 determines whether or not signaling information, which indicates whether corresponding content is a 2D image or a 3D image, is present. Upon determining that the signaling information is present, the signaling information processor 140 reads and transmits the signaling information to the controller 195. The signaling information processor 140 parses a Program Map Table (PMT) and/or an Event Information Table (EIT) for a 3D caption service and extracts a descriptor for a caption service from the parsed PMT and/or EIT and delivers the extracted descriptor to the video decoder (and/or controller) such that the caption service for the 3D service is appropriately processed at the video decoder (and/or controller).

The A/V decoder 150 receives and decodes the demultiplexed audio/video data. Here, the A/V decoder 150 may decode the data, for example, based on the signaling information processed by the signaling information processor 140.

In the following, a description of audio data processing is omitted and, primarily, video data processing associated with the present invention is described in more detail. A video signal, i.e., a 3D video ES, includes a header & extensions part including information items for video data processing and a part including actual video data.

In association with this, the video decoder according to the present invention may identify and process caption data received through a corresponding caption service channel, for example, based on the caption service descriptor extracted from the PMT and/or EIT.

The A/V decoder 150 includes a header & extensions unit 154 that processes the header & extensions part and a video data processor 152.

In association with the present invention, the header & extensions unit 154 extracts caption data and provides the extracted caption data to the caption data processor 160. Here, the caption data includes, for example, 3D caption data according to the present invention.

The caption data processor 160 decodes the caption data extracted and provided from the header & extensions unit 154. Here, the caption data processor 160 may decode the caption data, for example, based on the signaling information processed by the signaling information processor 140.

The graphics engine 170 generates a control signal for processing or the like required to provide each caption data item decoded by the caption data processor 160 in a 3D format and generates OSD data including 3D caption data according to the present invention through the OSD processor 180. The graphics engine 170 and the OSD processor 180 generate a full-resolution caption image for a left-eye image and a right-eye image and store the generated caption image in a buffer or memory (not shown).

The video data processor 152 extracts and decodes actual video data from the 3D video ES.

Each data item of the decoded 3D video ES is appropriately mixed at the mixer 185 via the corresponding component.

The 3D output formatter 190 formats and outputs the 3D video signal and the OSD data including the 3D caption data for the 3D video signal, which are mixed at the mixer 185, into a 3D output format. Here, the 3D output formatter 190 may be activated only when the decoded image data is 3D image data. That is, when the decoded image data is 2D image data, the 3D output formatter 190 is deactivated, i.e., the 3D output formatter 190 outputs the input image data without any special processing. Namely, here, the image data may bypass the 3D output formatter 190. The 3D output formatter 190 performs resizing or the like on the input image data according to the 3D format type of the 3D display (such as side-by-side or top/down), for example, in an input procedure of the image data.

The 3D output formatter 190 performs processing required for conversion from the decoded input video format into an output format.

In association with this, a video processing block(s) for artifact reduction, sharpness enhancement, contrast enhancement, de-interleaving, frame rate conversion, and/or other types of quality enhancement blocks may be performed between the A/V decoder 150 and the 3D output formatter 190 (3D output formatter performs the required conversion from the input (decoded) video format to a native 3D display format. Video processing such as artifact reduction, sharpness, contrast enhancement, de-interleaving, frame rate conversion, and other types of quality enhancement blocks may be present between the A/V decoder 150 and the 3D output formatter 190).

The controller 195 performs overall control of the digital receiver and may also control the A/V decoder 150, the controller 195, the caption data processor 160, the graphics engine 170, the OSD processor 180, and the 3D output formatter 190 based on the signaling information processed by the signaling information processor 140 to allow 3D caption data to be appropriately processed together with the 3D service. A description of such detailed control will be given later in more detail.

In association with provision of 3D caption data in a digital receiver, the present invention defines a caption data command code for a stereoscopic 3DTV using an offset of left-eye and right-eye images while maintaining backward compatibility with the caption data processing method of the legacy digital receiver and also suggests a processing method associated with the defined caption data command code. Especially, in the present invention, when the same depth is applied to a plurality of windows in the same screen, it is possible to specify the depths of all windows using a single command.

In the following description, the present invention will be described focusing on provision and processing of 3D caption data for a 3D service for ease of explanation. That is, a detailed description of the content of a 3D service associated with the present invention, for example, a detailed description of identification, processing, or the like of a 3D service will be omitted and only a necessary description thereof will be given.

Figure 2:
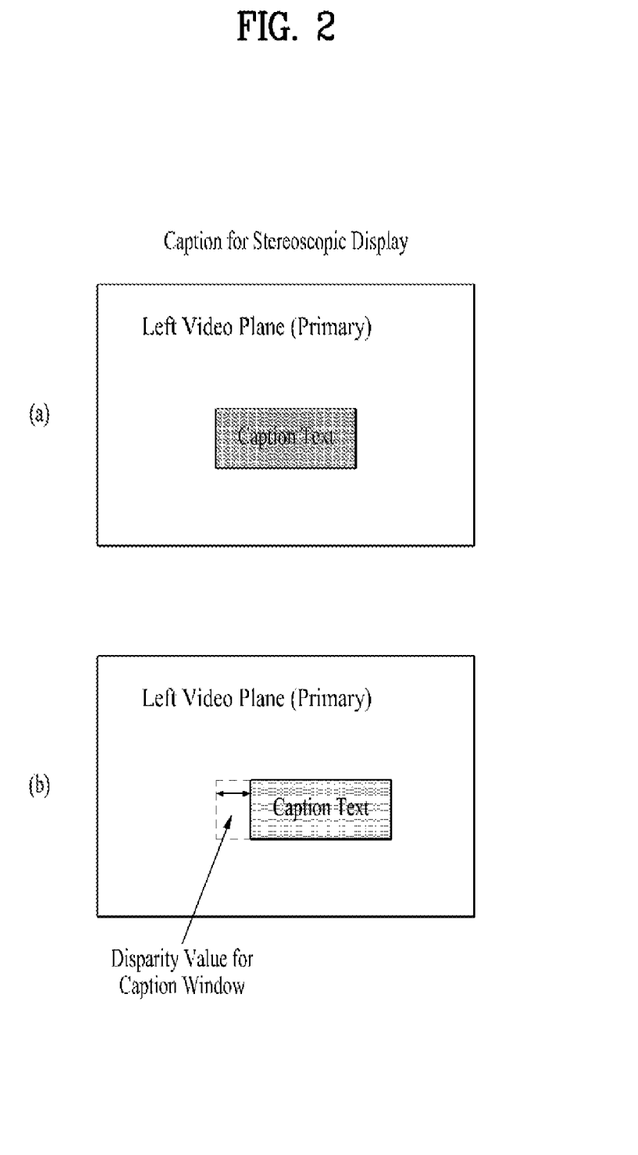
FIGS. 2 and 3 illustrate a caption for stereoscopic display according to the present invention.
Figure 3:
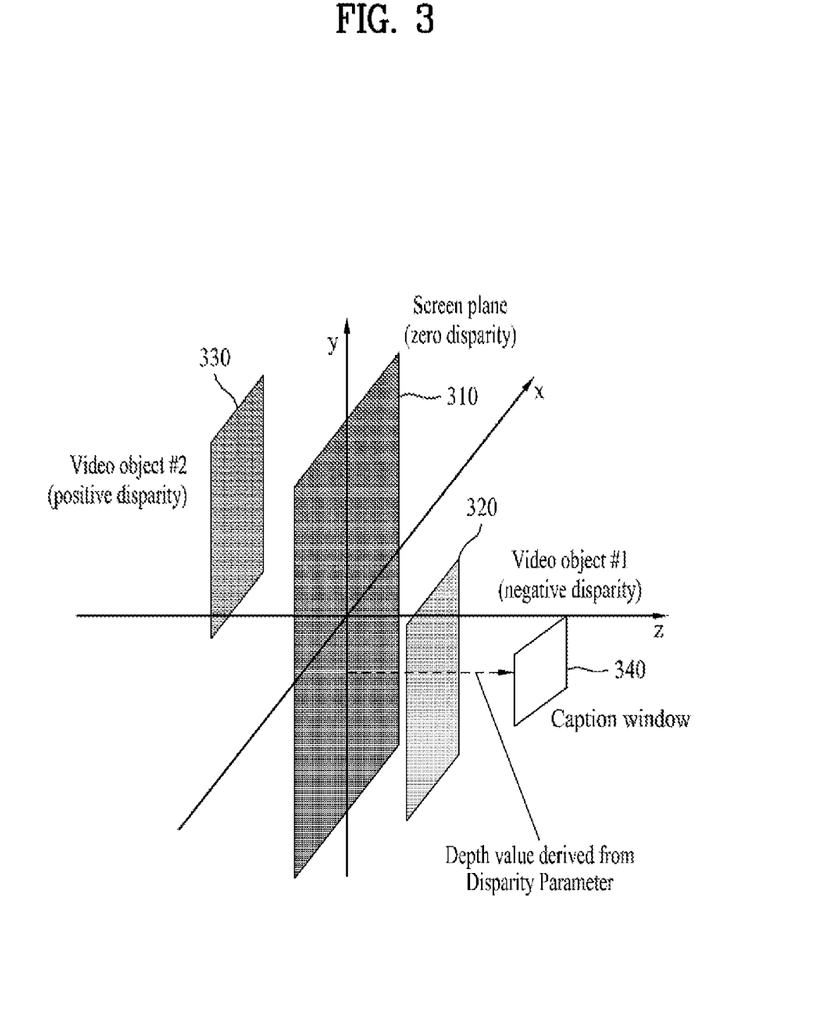

FIGS. 2 and 3 illustrate a caption for stereoscopic display according to the present invention.

Examples of FIGS. 2 and 3 illustrate a 2D caption having a 3D positioning feature. Specifically, FIGS. 2(*a*) and 2(*b*) illustrate how a 2D caption is positioned to create a 3D caption and illustrate the 3D caption more three-dimensionally.

FIGS. 2(*a*) and 2(*b*) also show a left video plane (primary plane) and a right video plane (secondary plane), respectively.

When caption text is positioned on the left video plane as a primary plane as shown in FIG. 2(*a*), the caption text is positioned on the right video plane as a secondary plane at a position corresponding to a disparity value for a caption window as shown in FIG. 2(*b*).

Finally, the planes of FIGS. 2(*a*) and 2(*b*) are combined to provide a 3D caption.

Referring to FIG. 3, a screen plane 310 is present on an x-y plane having a z-axis value of 0 (z=0) corresponding to zero disparity and video object #1 (320) and video object #2 (330) have negative disparity and positive disparity, respectively.

A caption window 340 having more negative disparity than the video object #1 is also present. The negative disparity of the caption window 340 has a depth value obtained from a disparity parameter described below.

The following is a description of an exemplary procedure for processing 3D caption data in a digital receiver according to the present invention.

Figure 4:
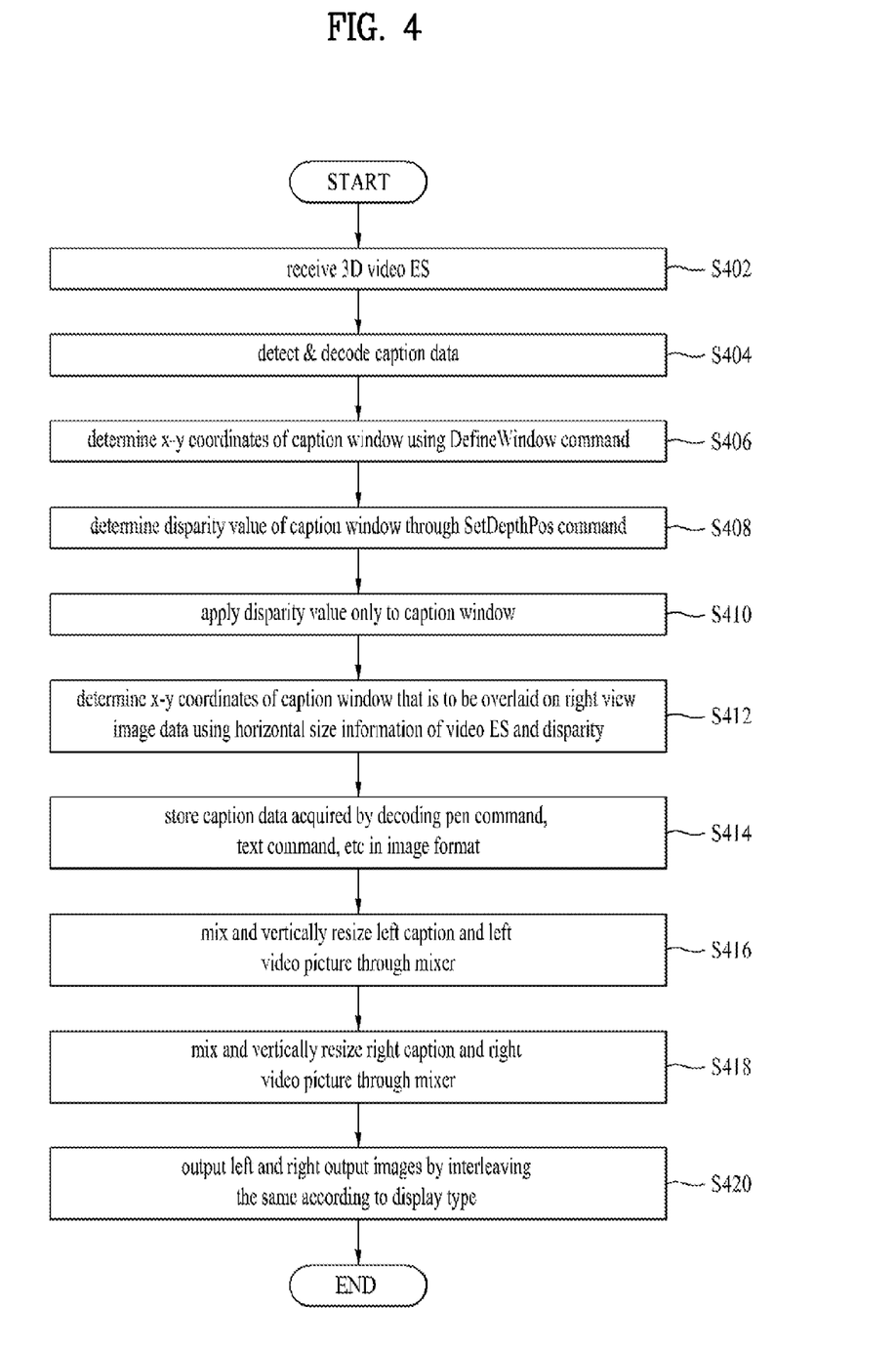
FIG. 4 illustrates an exemplary procedure for processing 3D caption data in the digital receiver according to the present invention.

FIG. 4 illustrates an exemplary procedure for processing 3D caption data in the digital receiver according to the present invention.

The video decoder receives a 3D video Elementary Stream (ES) (S402). Here, it is assumed that the 3D video ES has been coded, for example, into the top & bottom format. In this case, left view image data may be located at the bottom and right view image data may be located at the top.

The video decoder detects caption data included in a picture header (or Supplemental Enhancement Information (SEI) message) of the 3D video ES and provides the detected caption data to the caption data processor and the caption data processor then decodes the received caption data (S404).

The graphics engine and/or OSD processor determines the x-y coordinates of a caption window using a DefineWindow command (S406). Here, the determined x-y coordinates may be associated with, for example, left view image data.

The graphics engine and/or OSD processor determines a disparity value for the corresponding caption window through a SetDepthPos command (S408). This may be referred to as a start disparity.

The graphics engine and/or OSD processor extracts an Aw_flag and applies the same disparity value to all currently detected windows regardless of the window ID field if the extracted aw_flag is 1. On the other hand, the graphics engine and/or OSD processor extracts an aw_flag and applies the disparity value only to a caption window specified by the window ID field if the extracted aw_flag is 0 (S410).

The graphics engine and/or OSD processor determines x-y coordinates of the corresponding caption window that is to be overlaid on right view image data using the horizontal size of the video ES and the disparity (S412). Here, how the coordinates are determined will be described in more detail later.

The graphics engine and/or OSD processor stores caption data acquired by decoding other commands such as a pen command and a text command in an image format (S414). Here, the same image may be used for left and right video pictures. However, the coordinates of the left and right video pictures may be different due to the disparity.

The digital receiver mixes a left caption and a left video picture through the mixer. In this procedure, when left view image data of the 3D video ES is half resolution image data, vertical resizing is performed on the left caption (S416). An image obtained through such mixture is hereinafter referred to as a left output image.

The digital receiver mixes a right caption and a right video picture through the mixer (S418). In this procedure, vertical resizing is performed on the right caption in the same manner as on the left caption since the right view image of the 3D video ES is half resolution. An image obtained through such mixture is hereinafter referred to as a right output image.

The 3D output formatter interleaves the left output image and the right output image appropriately according to the display type and outputs the resulting images in the stereoscopic video display output procedure (S420). For example, when the display type is a horizontal line interleaving type which requires passive glasses, the 3D output formatter outputs the left output image and the right output image alternately line by line on the screen.

In association with the embodiments described above, metadata (for example, metadata associated with disparity between a left view image and a right view image) for processing of a 3D service and 3D caption data for the 3D service is defined and described below in detail.

Text (character) data may be coded according to a typical method described in the related standard.

X-Y coordinates of a 3DTV closed caption for a left view image may be coded using a typical method such as an anchor position based method.

The receiver may display closed caption data of the left view image using the typical method.

The receiver may then display a caption of the right view image at a front side or at a rear side of (i.e., in front of or behind) the screen plane along the depth axis.

The position of the closed caption on the right view image is determined using a given disparity (offset) value according to a suggested method.

A coding scheme is used to transmit disparity information. Here, the disparity information may be associated with an extension of an existing 2D closed captioning coding scheme.

The disparity described herein may be applied to any closed captioning data that is rendered in a caption window specified by the window ID in the disparity command code. When a new disparity value is received for a window having a predefined disparity value, the caption window simply moves along the depth axis.

A disparity value determined according to the display resolution of an image which is 1920 pixels wide is described below. When the receiver displays images in a narrower or broader area according to display resolutions, a pixel offset used to render captions is scaled according to an appropriate value. For example, when the resolution of an image to be displayed is 640 pixels wide, an offset applied to the right image caption is D*640/1920, where D is a disparity received in a closed captioning data string.

Metadata defined according to the present invention is described below in more detail.

Figure 5:
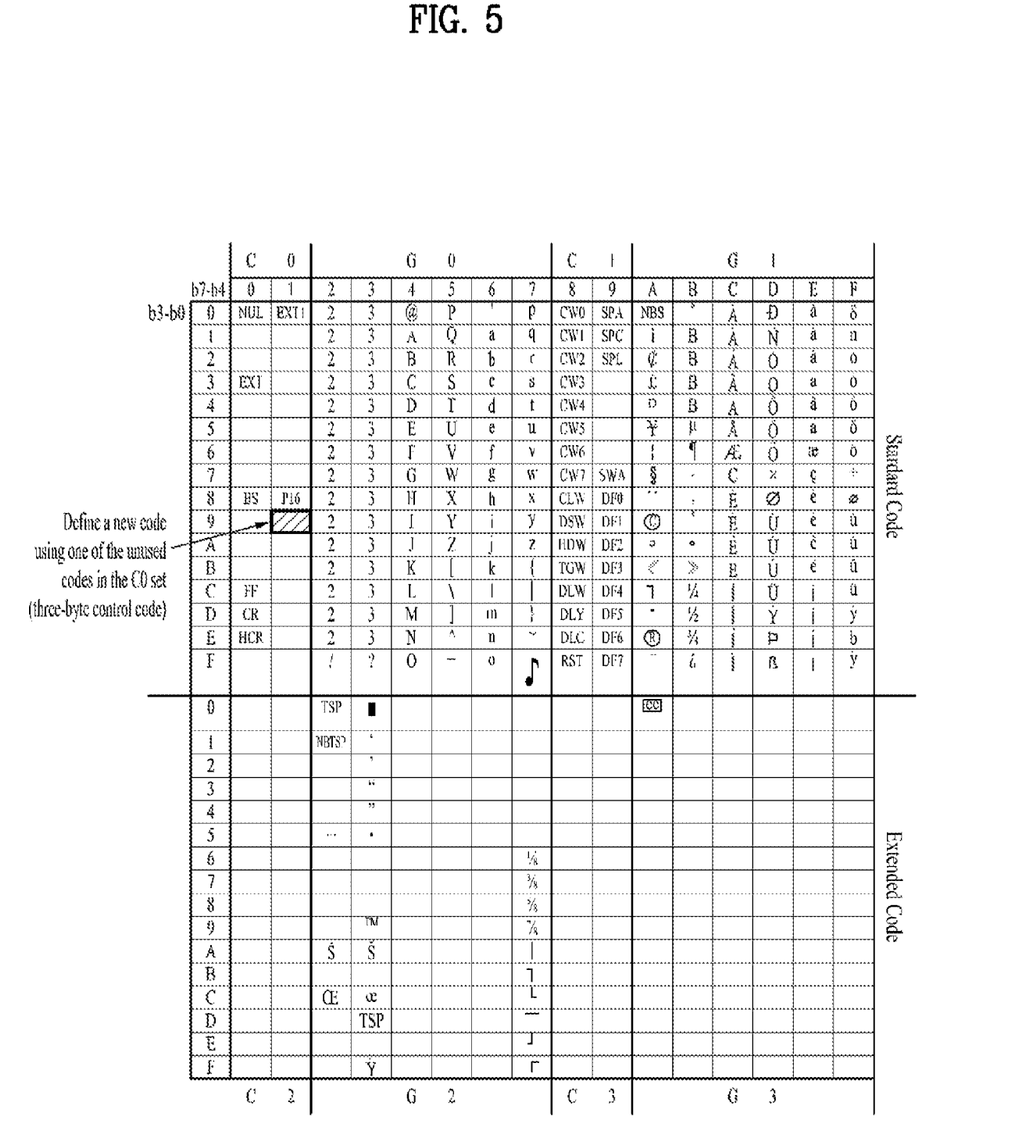
FIG. 5 illustrates exemplary code set mapping for disparity coding according to the present invention.
Figure 6:
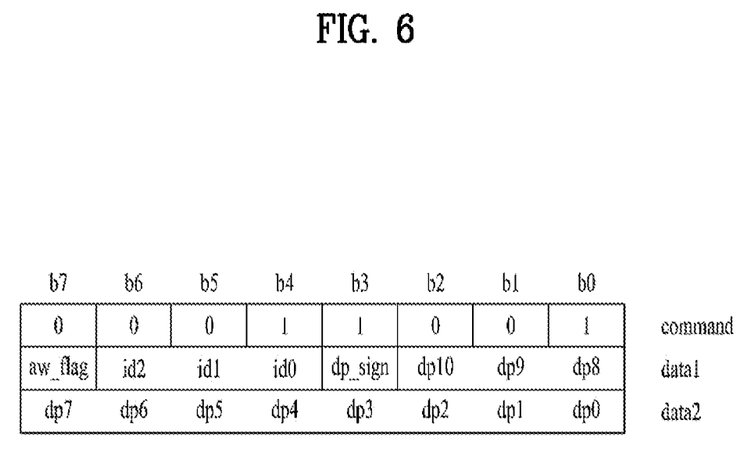
FIG. 6 illustrates an exemplary command code for disparity coding according to the present invention.

FIG. 5 illustrates exemplary code set mapping for disparity coding according to the present invention and FIG. 6 illustrates an exemplary command code for disparity coding according to the present invention.

Metadata (i.e., a command code) defined according to the present invention may be defined as a new code, for example, using one of the unused codes in a C0 set (3-byte control code) of the related standard which is illustrated in FIG. 5 for better understanding and ease of explanation of the present invention. However, the present invention is not limited to this example.

A command code for disparity coding according to the present invention is described in more detail below with reference to FIG. 6.

The command code for disparity coding is a total of 3 bytes. That is, the command code of FIG. 6 defines, for example, SetDepthPos (0x19), which describes the depth position of a caption window, and related data (data1 and data2).

Here, the command type may be window and the format may be that of the depth code. In addition, the depth code includes a window ID and a disparity parameter.

As shown in FIG. 6, the Most Significant Byte (MSB) of the data 1 may be an aw_flag field. Here, the aw_flag field indicates that a disparity parameter specified by "dp_sign and dp" described below is applied to all caption windows when the aw_flag field has a value of 1 and indicates that the disparity parameter is applied only to a window specified by the window ID when the aw_flag field has a value of 0.

The window ID indicates a unique window identifier. Up to 8 windows may be present per screen and the value of the window ID may indicate one of 0 to 7.

The disparity parameter (dp_sign, dp) specifies a disparity (offset) value between closed caption windows in left and right images in pixels. The disparity parameter may be specified (or described) for a display image resolution of 1920 pixels wide.

SetDepthPos specifies the Depth position of a window and a window ID to which this Depth position is applied (SetDepthPos specifies the Depth position of the window and the window ID this Depth position applies to). The window ID is required to indicate (or address) a window which has already been created by the DefineWindow command (The window ID is required to address a window which has already been created by the DefineWindow command). The Depth position is determined by a disparity parameter which is associated with the displacement between the caption windows on the left and right images (The Depth position is determined by the disparity parameter which is the displacement between the caption windows on the left and right images). SetDepthPos is a 3-byte command code to carry the disparity information (SetDepthPos is a 3-byte command code to carry the disparity information). The code 0x19 (code for SetDepthPos) indicates the following two bytes which specify the disparity for the caption window (The code 0x19 (code for SetDepthPos) indicates that the following two bytes specify the disparity for the caption window).

The legacy device handles the SetDepthPos command as an undefined 3-byte code. Accordingly, the legacy device will ignore the SetDepthPos command together with the following two bytes.

Figure 7:
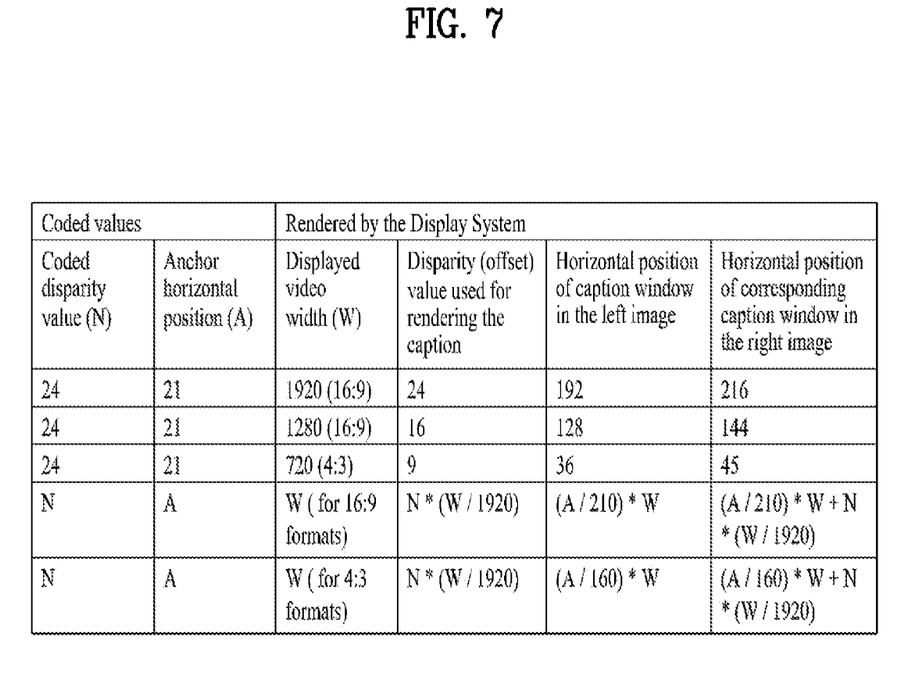
FIG. 7 shows a table illustrating an exemplary usage scenario according to the present invention.

FIG. 7 shows a table illustrating an exemplary usage scenario according to the present invention.

The table of FIG. 7 is mainly divided into coded values for 3D caption data of the usage scenario according to the present invention and values rendered in the display system, i.e., in the digital receiver.

The coded values include two types of values, i.e., a coded disparity value (N) and an anchor horizontal position (A).

The values rendered in the digital receiver include a displayed video width (W), a description (offset) value used for rendering the caption, a horizontal position of the caption window in the left image, and a horizontal position of the corresponding caption window in the right image.

In the usage scenario, it is assumed, for example, that the left image is a primary view image and the right image is a secondary view image.

All numbers in the table may indicate, for example, pixels.

According to the related standard, the horizontal position indicates the leftmost pixel of the caption window.

The horizontal position of the caption window and the rendered offset may be obtained based on resolution of displayed left and right images rather than based on spatial compression resolution.

The following is a description of a processing method for smooth change of the caption depth according to the present invention.

The above and following descriptions are associated with a mechanism for supporting change of the depth axis of a caption window to which the number of frames, an end disparity, and an initial disparity are provided.

The initial disparity value may be specified by the SetDepthPos command described above.

Here, ChangeDepthPos specifies the end disparity value and the number of frames during which a smooth change occurs in the caption depth (ChangeDepthPos will specify the end disparity value and the number of frame count during which the smooth variation of caption depth takes place).

Figure 8:
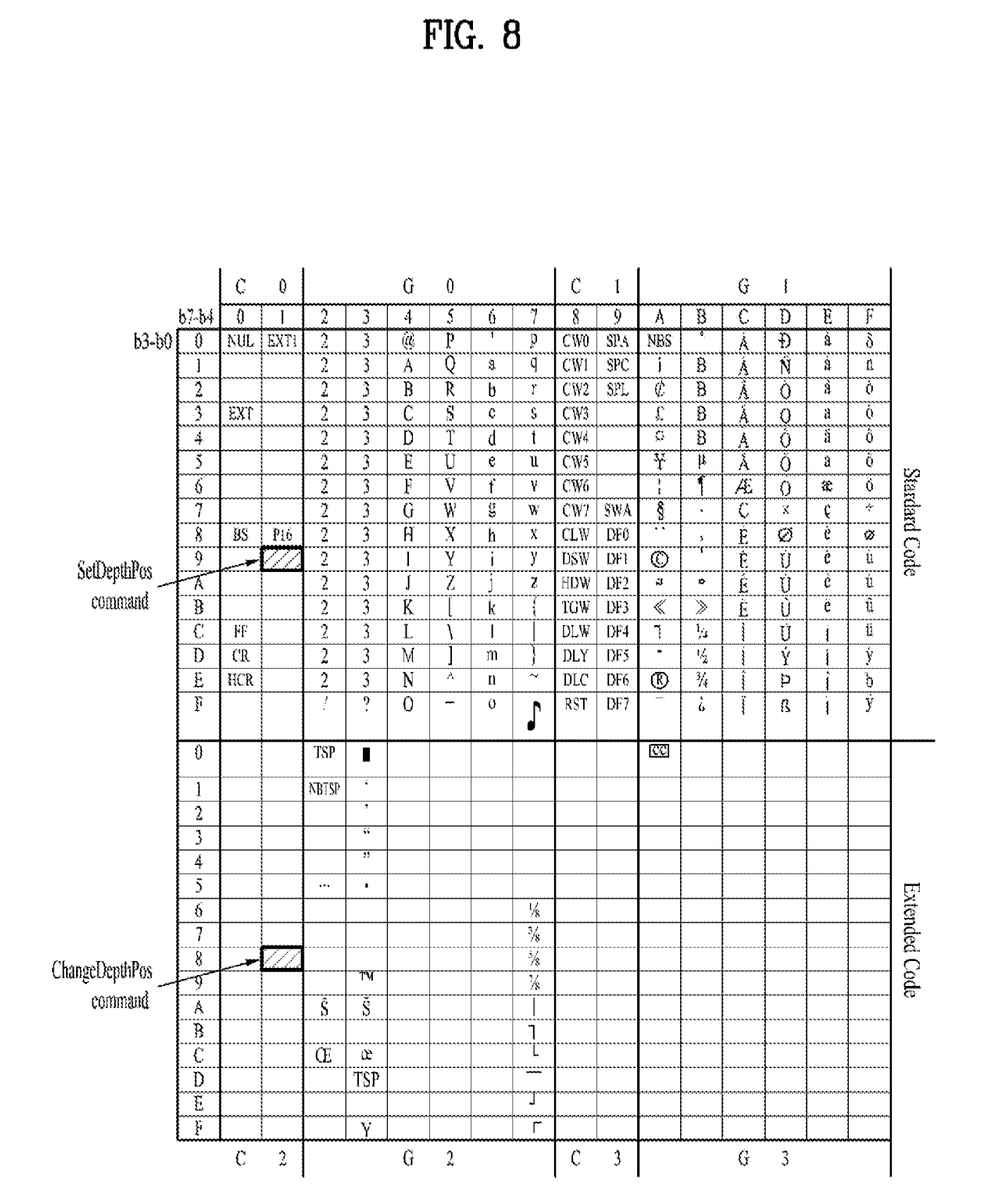
FIG. 8 illustrates exemplary code set mapping for smooth change of the depths of caption windows according to the present invention.

FIG. 8 illustrates exemplary code set mapping for smooth change of the depths of caption windows according to the present invention.

The code set mapping of FIG. 8 differs from the code set mapping for disparity coding shown in FIG. 5 although both are similar in some aspects.

As described below, in the example of FIG. 8, at least two command codes SetDepthPos and ChangeDepthPos are used for smooth change of the depths of caption windows according to the present invention and the two command codes differ in that the first command code SetDepthPos is used in "C0" and the second command code ChangeDepthPos is used in "C2".

In this regard, code space, command code, and the like are described below.

Figure 9:
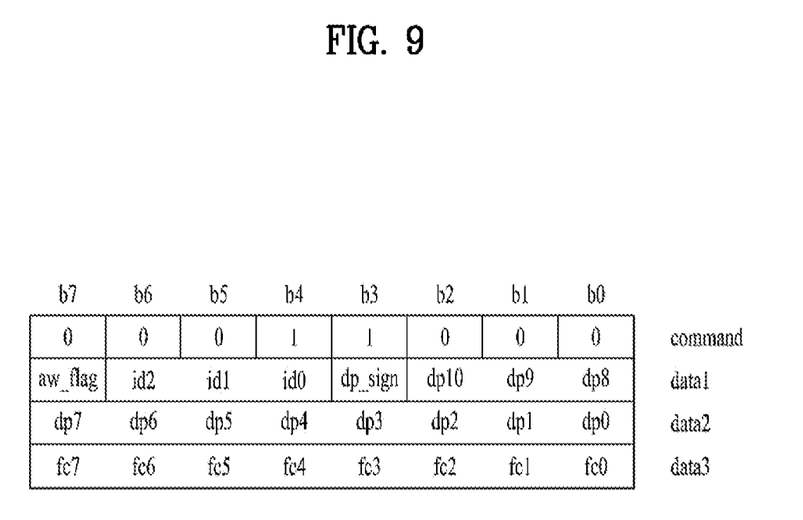
FIGS. 9 and 10 illustrate exemplary command codes for smooth change of the depths of caption windows according to the present invention.
Figure 10:
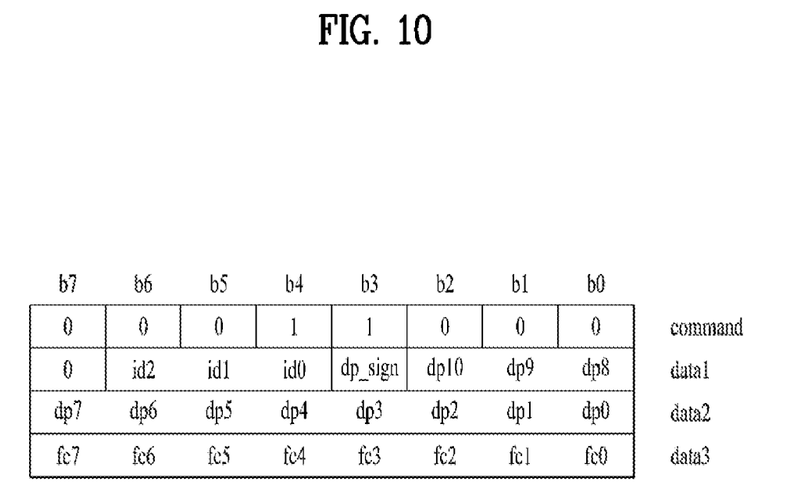

FIGS. 9 and 10 illustrate exemplary command codes for smooth change of the depths of caption windows according to the present invention.

Basically, the ChangeDepthPos command code specifies the depth position of the caption window. Here, the command type may be window and the format may be that of ChangeDepthPos (window ID, end disparity value, and the number of frames).

The following is a detailed description of parameters.

The ChangeDepthPos command code may include a total of 4 bytes. The command code (or command coding) may be include EXT1+ChangeDepthPos+<data1>+<data2>+<data3>. Here, ChangeDepthPos is defined as 0x19 in the example of FIG. 10 while ChangeDepthPos is defined as 0x18 in the example of FIG. 9. The difference between the two command codes is associated with whether an aw_flag is used in association with the present invention.

A detailed description of the aw_flag and the window ID shown in FIG. 9 is omitted since the aw_flag and the window ID are similar to those shown in the previous figures.

Referring to FIGS. 9 and 10, the end disparity value (dp_sign, dp) specifies a resulting disparity (offset) value between closed caption windows in left and right images in pixels after the number of frames specified by the frame count. This disparity parameter is specified (or described) for a display image resolution of 1920 pixels wide.

The frame count (fc) may indicate the number of frames during which during which such a smooth change occurs in the disparity from the initial disparity value to the end disparity value of the window (frame count (fc) may indicate the number of frames during which the variation of disparity from the initial disparity value to the end disparity value of the window is taking place).

The following is a description of a ChangeDepthPos command code for smooth (or gradual) change of the caption window in the above procedure.

ChangeDepthPos specifies smooth change of the depth position of the window by specifying the duration of the variation and the target disparity values (ChangeDepthPos specifies the smooth changing of depth position of the window by specifying the duration of the variation and the target disparity values). ChangeDepthPos also specifies the window ID of a window to which such a smooth change is applied. The window ID indicates a window which has already been created by the DefineWindow command (The window ID is required to address a window which has already been created by the DefineWindow command). The initial depth position of the window is determined by the disparity value specified in the SetDepthPos command (The initial depth position of the window is determined by the disparity value specified in SetDepthPos command). The window will move along the z axis using the end disparity value and the frame count (The window will move along the z-axis using end disparity value and frame count). The receiver will adjust the disparity of the window ID after the number of frames specified by the frame count such that the final disparity of the window is the end disparity value (The receiver will adjust the disparity of the window ID so that after the number of frames specified by frame count, the final disparity of the window will be end disparity value).

Legacy devices will handle the 4-byte ChangeDepthPos command as an undefined 4-byte code. Therefore, legacy devices will ignore the ChangeDepthPos command together with the following three bytes.

Here, note that ChangeDepthPos can specify change of the depth for up to 255 frames. If a change needs to be made in the depth for a duration longer than 255 frames, this may be signaled using multiple pairs of SetDepthPos and ChangeDepthPos commands (Note that ChangeDepthPos can specify the variation of depth for up to 255 frames. If the variation of depth requires longer duration than 255 frames, it can be signaled using multiple pairs of SetDepthPos and ChangeDepthPos commands).

When the digital receiver has no capability to smoothly change the depth, the digital receiver may ignore, for example, the SetDepthPos command.

The writer (or author) of the caption will need to insert the second SetDepthPos command after the number of frames (fc) in order to inform receivers with limited capabilities of the final depth of the window.

The following is a description of a usage scenario of the above embodiments.

For example, a command sequence for simple pop-on captioning for receivers with limited capabilities is as follows.

a) DeleteWindow command which removes all windows excluding one displayed window.
b) DefineWindow command which defines a hidden window.
c) SetWindowAttributes command which customizes a hidden window.
d) Pen Commands & Caption Text commands
e) ClearWindows command which clears a displayed window.
f) SetDepthPos command which defines the depth position of the hidden window.
g) ToggleWindows command which defines toggling between the hidden window and the displayed window.
h) SetDepthPos command
i) Pen commands & Caption Text commands
j) SetDepthPos command
k) Pen commands & Caption Text commands These and other commands may be sequentially used.

The following is a command sequence for simple pop-on captioning having commands for smooth change of the depths of caption windows according to the present invention. This command sequence is provided for receivers having improved performance.

a) DeleteWindow command
b) DefineWindow command
c) SetWindowAttributes command
d) Pen Commands & Caption Text commands
e) ClearWindows command
f) SetDepthPos command (where the depth value is applied to all windows if the aw_flag value is 1)
g) ChangeDepthPos command which defines smooth change of the depth position (where the depth value is also applied to all windows if the aw_flag value is 1)
h) ToggleWindows command
i) SetDepthPos command
j) Pen commands & Caption Text commands
k) ChangeDepthPos command
l) SetDepthPos command
m) Pen commands & Caption Text commands
n) ChangeDepthPos command These and other commands may be sequentially used.

Figure 11:
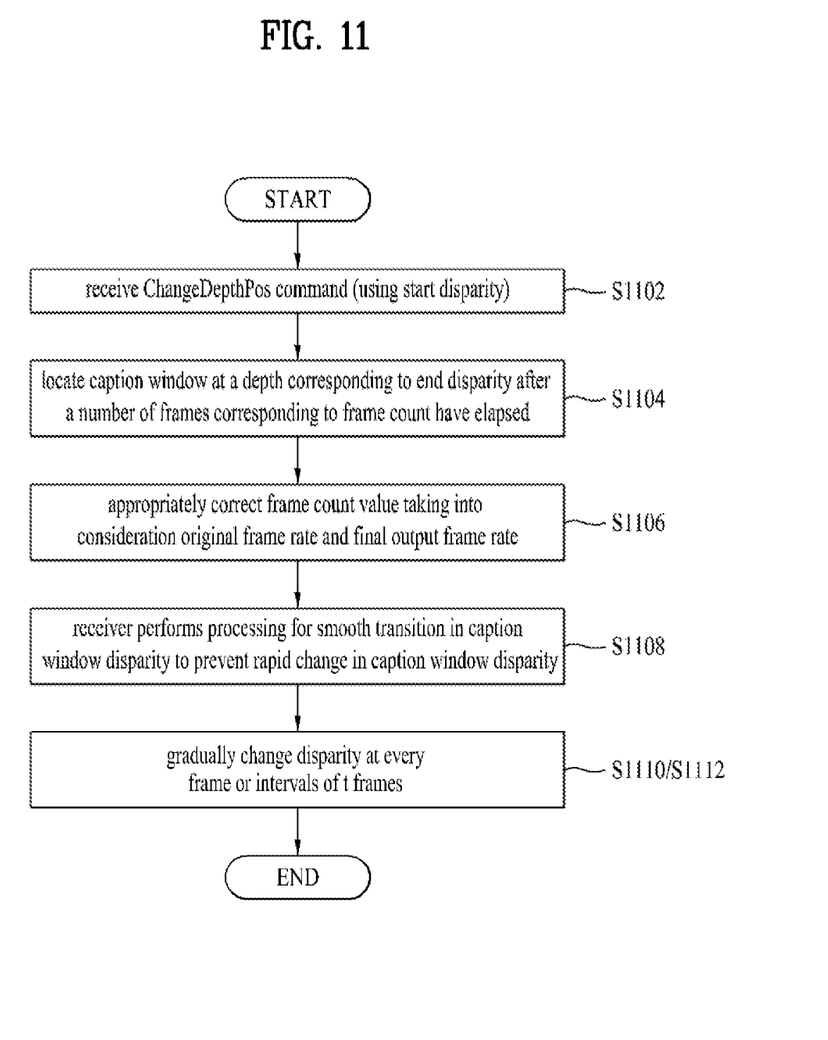
FIG. 11 illustrates another exemplary procedure for processing 3D caption data in the digital receiver according to the present invention.

FIG. 11 illustrates another exemplary procedure for processing 3D caption data in the digital receiver according to the present invention.

The procedure of FIG. 11 may be a procedure subsequent to that of FIG. 4 described above. Thus, for details of the previous procedure, reference may be made to the above description of FIG. 4 and a detailed description thereof may be omitted herein.

When the graphics engine and/or OSD processor has received a ChangeDepthPos command, a start disparity value is used as a disparity value corresponding to a time point at which a corresponding 3D caption is initially displayed (S1102). Here, the 3D caption may use a window ID such that a different window may be applied according to the aw_flag.

The graphics engine and/or OSD processor allows the caption window to be located at a depth corresponding to the end disparity after a number of frames corresponding to the frame count have elapsed (S1104).

When frame rate conversion has occurred in the display in the implementation procedure of step S1104, the graphics engine and/or OSD processor appropriately corrects the frame count value taking into consideration an original frame rate and a final output frame rate. That is, if the original frame rate is 30 and the output frame rate is 240 in the display procedure, the end disparity is applied after a number of frames corresponding to 8×(frame count) have elapsed in the display rendering procedure (S1106).

If the time point at which the caption window is initially displayed is "A" in the implementation procedure of step S1104, the graphics engine and/or OSD processor allows the disparity for the caption window after "A+(frame_count)/original_frame_rate)" to have the end disparity value. Here, in a time interval between "A" and "A+(frame_count)/original_frame_rate)", the receiver performs processing for smooth transition in the caption window disparity to prevent rapid change in the caption window disparity (S1108).

When the graphics engine and/or OSD processor changes the disparity every frame in the implementation procedure of step S1108, the same amount of change as (end_disparity−start_disparity)/(frame_count) occurs every frame. Accordingly, when such implementation is a burden on the performance of the receiver, the graphics engine and/or OSD processor gradually changes the disparity at intervals of t frames.

In the above procedure, if the aw_flag value is 1, this procedure is applied to all windows defined in the current service regardless of the window ID field. If the aw_flag value is 0, the above procedure is performed only on a caption window specified by the window ID field.

The following is a description of the above embodiments in association with performance of the digital receiver according to the present invention.

When the decoder is ideal, the decoder may interpret an SDP command as an offset relative to a DFn command for a right eye image. If the disparity value is corrupt or improper, the offset may be limited to the actual screen display space (This decoder will interpret the SDP command as an offset relative to the DFn command for the right eye image. If the disparity value is corrupted or otherwise improper, the offset will be limited to the actual screen display space).

This decoder may interpret the CDP command by moving the right image by a fraction of the difference between the current window disparity value and the end disparity value for each of the "number of frames" defined by this command. If the end disparity value is corrupted or improper, the final offset may be limited to the actual screen display space (This decoder will interpret the CDP command by moving the right image by a fraction of the difference of the current window disparity value and the end disparity value for each of the "number of frames" defined by this command. If the end disparity value is corrupted or otherwise improper, the final offset will be limited to the actual screen display space).

The window ID of the above commands is applied for the depth command and does not reset the current window value for other commands (The window ID of the above commands will apply for the depth command and does not reset the current window value for other commands).

The motion of the CDP command will commence on the display or toggle the window command to make the window visible. If the window is already visible, the action may commence immediately (The motion of the CDP command will commence on the display or toggle window command that makes the window visible. If the window is already visible, the action commences immediately).

If a new CDP command is issued before the previous CDP command is completed, the decoder may simply compute a new fractional movement toward the revised end disparity value (If a new CDP command is issued before the previous CDP command is completed, the decoder simply computes the new fractional movement toward the revised end disparity value).

A clear window command has no influence on the position or movement of the caption window. A delete or hide window command will move the offset to the end disparity value (A clear window command will have no affect on the position or movement of the caption window. A delete or hide window command will move the offset to the end disparity value).

The following is a description of static caption windows. This caption decoder does not dynamically move caption windows. SDP commands are not affected and are handled as with the ideal decoder (This caption decoder is not able to dynamically move caption windows. SDP commands are not affected and are handled as in the ideal decoder).

The decoder does not move the caption window on a continuous basis and therefore the CDP command is handled slightly differently (Since the decoder does not move the caption window on a continuous basis, the CDP command is handled slightly differently). The decoder may perform a delay action for the period of the "number of frames (The decoder will delay action for the period of "number of frames."). Thereafter, the corresponding caption window will change to the end disparity value (After that time, the right caption window will move to the end disparity value). As described above, the end disparity value is subject to the limits of the display space (As above, the end disparity value is subject to the limits of the display space).

On the other hand, the 2D only decoder has no capability to process the SDP or CDP commands. That is, the decoder can process only simple commands and 2D images associated with captions. Accordingly, the SDP and CDP commands are ignored (This decoder has no capability to process the SDP or CDP commands. In this case, the decoder simply processes the standard commands as though the image were a standard 2D image. The SDP and CDP commands are ignored).

Various embodiments have been described above for carrying out the invention.

As is apparent from the above description, the digital receiver according to the present invention can provide 3D caption data while maintaining compatibility with legacy devices. In addition, when a plurality of 3D caption data is provided, the digital receiver can fully or individually control the plurality of 3D caption data. Even when disparity information of 3D caption data has rapidly changed, the digital receiver can perform processing so as to prevent the user from experiencing vertigo.

The present invention, which relates to a digital broadcast system that provides a 3D service, can be fully or partially applied to the digital broadcast system.

What is claimed is:

1. A method for processing a broadcast signal for a three-dimensional, 3D, service in a digital receiver, the method comprising:
    receiving and parsing the video elementary stream;
    decoding the 3D caption service data from the video elementary stream; and
    wherein the 3D caption service data includes a command code that carries disparity information indicating disparity data,
    wherein the disparity data represent difference between right and left views and the disparity data is specified using a horizontal resolution
    wherein the disparity information includes information indicating whether the disparity data applied to all caption windows or a caption window, and the number of frame counts; and
    rendering a 3D caption service, wherein the 3D caption service is rendered by applying the disparity data over time corresponding to the number of frame counts.

2. The method according to claim 1, wherein the disparity information includes information indicating an amount of change in slope to apply to the disparity data, and
    wherein the 3D caption service is rendered with a change in accordance with the amount of change.

3. A digital receiver for processing a broadcast signal for a three-dimensional, 3D, service, the digital receiver comprising:
    a receiver for receiving and parsing the video elementary stream;
    a decoder for decoding the 3D caption service data from the video elementary stream; and wherein the 3D caption service data includes a command code that carries disparity information indicating disparity data, wherein the disparity data represent difference between right and left views and the disparity data is specified using a horizontal resolution wherein the disparity information includes information indicating whether the disparity data applied to all caption windows or a caption window, and the number of frame counts; and a renderer for rendering a 3D caption service, wherein the 3D caption service is rendered by applying the disparity data over time corresponding to the number of frame counts.

4. The digital receiver according to claim 3, wherein the disparity information includes information indicating an amount of change in slope to apply to the disparity data, and wherein the 3D caption service is rendered with a change in accordance with the amount of change.

* * * * *